United States Patent [19]
Levinson et al.

[11] 3,906,644
[45] Sept. 23, 1975

[54] METHOD OF PRESENTING READING MATERIAL TO DYSMETRIC DYSLEXIC-IDENTIFIED CHILDREN

[76] Inventors: Harold N. Levinson, 15 Lake Rd., Great Neck, N.Y. 11020; Jan Frank, 45 E. 82nd St., New York, N.Y. 10028

[22] Filed: Jan. 6, 1975

[21] Appl. No.: 538,880

Related U.S. Application Data

[63] Continuation-in-part of Ser. No. 516,162, Oct. 21, 1974, abandoned.

[52] U.S. Cl. ............... 35/35 R; 128/2 R; 351/39
[51] Int. Cl.² .................................... G09B 17/00
[58] Field of Search ............ 35/35 R, 35 B, 35 J; 351/30, 31, 39; 128/2 R, 2 N, 2 T, 2.1 M

[56] References Cited
UNITED STATES PATENTS

| | | | |
|---|---|---|---|
| 1,791,708 | 2/1931 | Bridges | 35/35 J X |
| 2,184,415 | 12/1939 | Dittmer | 351/30 |
| 2,265,334 | 12/1941 | Armbruster | 35/35 J X |
| 2,723,466 | 11/1955 | Ott | 35/35 B |
| 2,795,993 | 6/1957 | Leverett et al. | 128/2 T |
| 2,887,006 | 5/1959 | Yale | 35/35 B X |
| 3,000,271 | 9/1961 | Harvey et al. | 128/2.1 M |
| 3,030,944 | 4/1962 | Blau et al. | 128/2 N |
| 3,179,004 | 4/1965 | Stoyanoff et al. | 35/35 B X |
| 3,416,857 | 12/1968 | Lookabaugh | 128/2 T |
| 3,517,988 | 6/1970 | Schwind | 351/30 |
| 3,842,822 | 10/1974 | Levinson et al. | 128/2 R |

*Primary Examiner*—Wm. H. Grieb
*Attorney, Agent, or Firm*—Bauer & Amer

[57] ABSTRACT

The within method recognizes that although a dysmetric dyslexic child is unable to properly perform sequential scanning, he nevertheless is capable of performing as well as a normal person in static vision exercises, i.e. in an exercise which requires his identification of stationary objects of fixed height at specified distances. The within method thus calls for the presentation of reading material in letter or word-sized units, one at a time and in reading sequence, at a fixed location, so that the child reading is not required to sequentially scan the reading material. That is, the material is presented in temporal rather than spacial sequence or relation. As a result, there is only slight or minimal eye vibration or nystagmus imposed upon the child which results in minimal ocular overshooting and undershooting and avoids blurring and scrambling. The manner in which the reading material is presented thus does not contribute to, i.e. avoids or minimizes, a failure in the child to properly focus and perceive the material being presented for reading. It also makes use of a heretofore unknown compensatory mechanism existing in dysmetric dyslexic children, namely functional narrowing of the visual field so as to avoid blurring.

8 Claims, 6 Drawing Figures

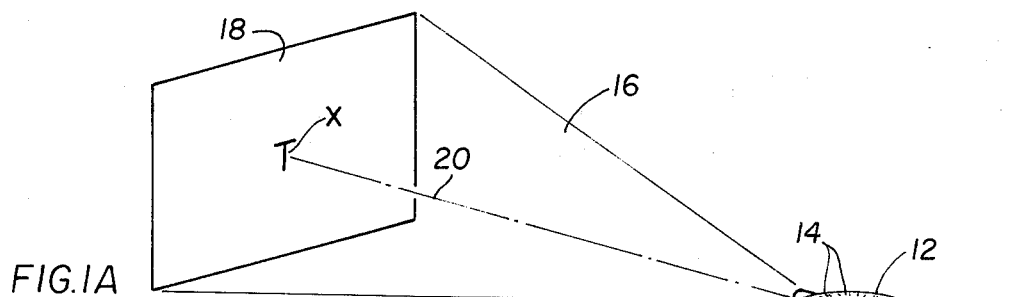
FIG.IA
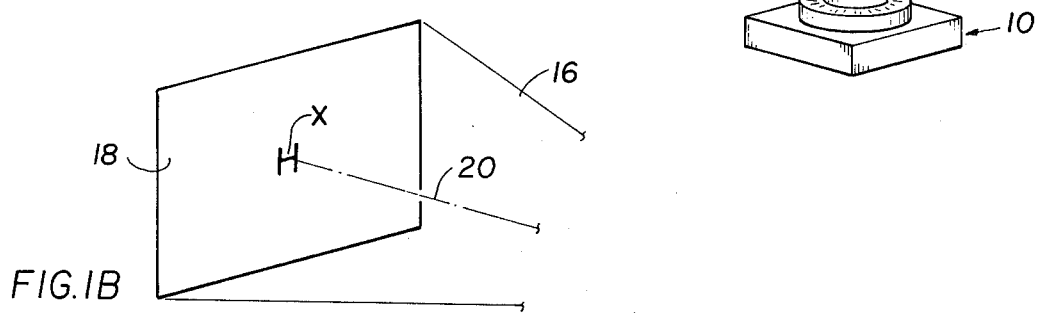
FIG.IB
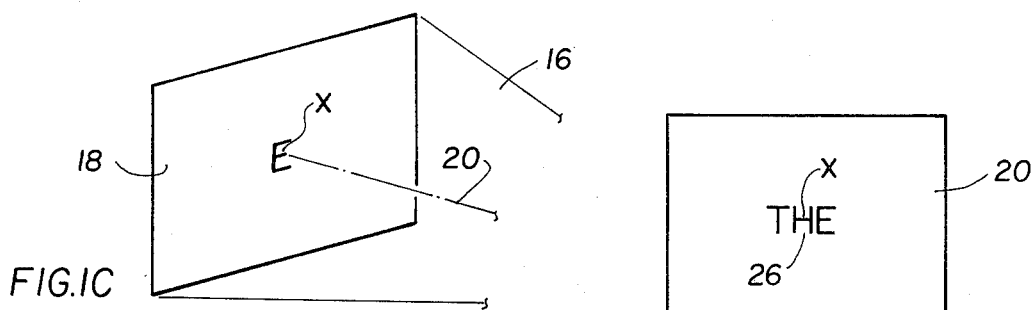
FIG.IC
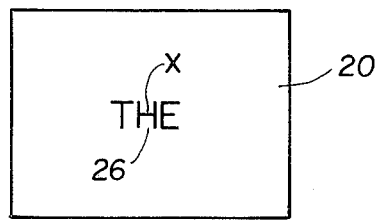
FIG.2A
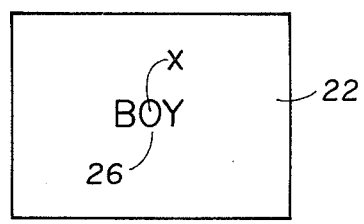
FIG.2B
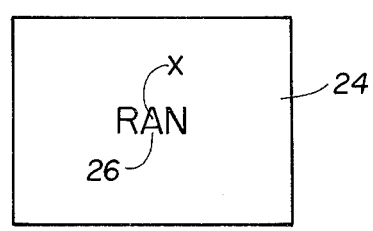
FIG.2C

METHOD OF PRESENTING READING MATERIAL TO DYSMETRIC DYSLEXIC-IDENTIFIED CHILDREN

This application is a continuation-in-part of application Ser. No. 516,162, filed Oct. 21, 1974, now abandoned.

The present invention relates to a method of presenting material for reading to a child previously identified as being dyslexic because of dysfunctioning cerebellar-vestibular circuits.

Underlying the reading material-presentation method of the present invention is the discovery that the condition of dysmetric dyslexia is attributable to a cerebellar-vestibular dysfunction. This is contrary to the more widely accepted belief in the medical profession that the condition of organically determined dysmetric dyslexia is due solely or at least primarily to a dysfunction of the cortex. It suffices, however, for the present purposes to indicate that the aforesaid cerebellar-vestibular dysfunction manifested in dysmetric dyslexic children is proved by positive Rombergs, difficulty in tandem walking, articulatory speech disorders, dysdiadochokinesis, hypotonia, and various dysmetric or past pointing disturbances during finger-to-nose, heel-to-toe, writing, drawing, as well as during ocular fixation and scanning testing.

Another significant medical discovery underlying the present invention is that there exists in dysmetric dyslexic children a sub-clinical nystagmus or eye vibration at an almost imperceptible frequency or number of beats per second. Here also, for present purposes, it suffices to indicate that the existence of this sub-clinical nystagmus or eye vibration is demonstrated by electronystagmographic recordings when the eyes were closed to eliminate fixation, as this tends to inhibit nystagmus.

With children suffering from the condition indicated, there is at all times movement in their eyes occurring at approximately one beat per second, which interferes with the fixation or vision of these children. This abnormal eye movement is, as noted, sub-clinical in nature, in that measurement thereof requires an electronystagmographic frequency recording under favorable conditions.

The foregoing sub-clinical dysfunction or nystagmus has, in turn, been traced to the presence of a cerebellar-vestibular dysfunction which prevents ocular fixation and sequential scanning of letters and words in a proper manner. Specifically, during sequential scanning or normal reading by dysmetric dyslexic children, letters and words are disordered, and letter and word scrambling or blurring results. For example, the biggest or first letter of the word is often fixated first during the slow right-to-left phase of the nystagmus. The rapid left-to-right phase often skips over several letters or a whole word until another letter is automatically fixated and scrambling or blurring results. The child, therefore, confuses letters and words which differ only or mainly in spacial placement, i.e. $b=d=p=q$, $a=e$, $\epsilon=3$, $c=u$, $m=w$, saw=was, no=on, et cetera. The aforesaid confusion of letters and words results in reading difficulties, as indicated below.

Specifically, a Position Paper on READING DISABILITIES IN YOUR CHILD of the American Association of Ophthalmology presented and distributed at the Forum, "THE RIGHT TO READ" of the White House Conference on Children, Washington, D.C., Dec. 14, 1970, entitled "DYSLEXIA" defines the term "dyslexia" as a difficulty in reading or reading disability because of a poor understanding of printed words. Dyslexia caused by obvious conditions such as prolonged absence from school, psychological problems, or obvious (generally cortical) brain defects is identified as "secondary dyslexia". The dyslexia which is stated to be of unknown origin is referred to as "specific primary dyslexia or developmental dyslexia". The paper continues with the teaching that eye defects do not cause specific primary dyslexia because the dyslexia is based on recognition and not on vision. This view is representative of the widely accepted belief of the medical profession that this form of dyslexia is caused by an inability of the brain to recognize what the eye sees (see, for example: "Reading Disability" edited by John Money, pp. 9–16 and 45–60, The John Hopkins Press (1962); and Vol. 20, No. 3, August 1973 issue of "Pediatric Clinics of North America", pp. 587–597 and 599–605.) Primary dyslexia was therefore attributed to a dysfunction of the cortex.

This has been demonstrated to be inaccurate, for the reasons indicated in U.S. Pat. No. 3,842,822, wherein it has been proven that in most cases of dyslexia, the cortex is intact, but the eyes send blurred and scrambled visual signals of the material being read to the brain and, as a result, the brain cannot understand said material.

Since dyslexia was defined as a reading disability, children suffering from dyslexia were not found until they were discovered to be deficient readers. In many cases, the child is about two years behind its age group in reading by the time the reading difficulties are attributed to primary dyslexia rather than other causes. In most cases, the symptoms of this form of dyslexia tend to lessen when the child reaches about ten to twelve years of age, depending upon the child's rate of maturation. When the symptoms of primary dyslexia are no longer apparent, the child's ability to learn to read approaches normal. One often must delay the teaching of reading skills to a child known to be dysmetric dyslexic until he has reached a level of maturity to cope with the requirements of reading, even though he may then be as much as two years behind his age group.

Broadly, it is an object of the present invention to provide an effective method for teaching and for permitting reading by dysmetric dyslexic children which overcomes the foregoing and other shortcomings of the prior art. Specifically, although as already noted a dysmetric dyslexic child performs poorly when called upon to read in the conventional manner, during which he must exhibit ocular fixation and sequential scanning (tracking) or dynamic vision, we have made the surprising discovery that this same child will perform as well as a normal person on eye tests and reading activity measuring "static" vision or visual acuity — identification of stationary objects of fixed height at a specific distance. It is an object to advantageously utilize this "static" reading skill possessed by dysmetric dyslexic children to enhance their ability to learn and to read. It has also been discovered that dysmetric dyslexic children strive to avoid blurring by narrowing their visual field, and thus it is a further object to advantageously utilize this compensatory mechanism in the within method by presenting reading material in a limited or restricted, and thus functionally narrowed visual field.

The above brief description, as well as further objects, features and advantages of the present invention, will be more fully appreciated by reference to the following detailed description of the inventive method and of a presently preferred, but nonetheless illustrative, apparatus for practicing said method, said description to be read in conjunction with the accompanying drawings, wherein:

FIGS. 1A, 1B and 1C are perspective views illustrating the manner in which reading material is displayed in accordance with the present invention and of a projection device for displaying the same; and FIGS. 2A, 2B and 2C illustrate the manner in which material is displayed in a temporal or reading sequence.

As already noted, underlying the present invention is the recognition that a child who is dyslexic because of a dysfunctioning of his cerebellar-vestibular circuits is at all times experiencing a sub-clinical eye movement of approximately one beat per second, and that this interferes with the child's dynamic vision. As further noted, the impaired vision is of a specific character. Specifically, it is an inability to achieve sequential scanning, i.e. tracking, of material presented for reading, or what is herein referred to as dynamic vision. This is to be distinguished from static vision or visual acuity. That is, whereas a dysmetric dyslexic child will perform as well as a normal person on eye tests measuring "static" vision or visual acuity — identification of stationary objects of fixed height at specific distances, when said dysmetric dyslexic child is required to follow a moving target, i.e. track, the eye vibration or nystagmus and dysmetric ocular pursuit, which are the conditions discovered to exist in such a person, results in ocular overshooting and undershooting, and in turn, results in failure to focus and sequentially track the material being read. This failure, more particularly, results in the material being scrambled and blurred.

Even assuming that the aforesaid difficulties of a dyslexic child are properly diagnosed, and the child thereafter properly treated so that he is not psychologically impaired, there was still no solution to the basic, problem of how to assist the child in achieving better reading performance. Rather since it is known that the symptoms of the aforesaid form of dyxlesia tend to lessen when the child reaches about ten to twelve years of age, depending upon the child's rate of maturation, a dysmetric dyslexic child could only be excused from most reading activity requiring tracking until he matured sufficiently to be able to cope with the tracking requirements of reading. This solution is obviously unsatisfactory, since the child when "able" to read, is then typically about two years behind his age group with consequent emotional and behavior problems.

An important contribution of the present invention is therefore the devising of a method, as now will be described, which will effectively enable the teaching of reading skills to dysmetric dyslexic children on a group or individual basis. The crux of the method is the minimizing or elimination, during reading, of any significant requirement for the child to engage in sequential scanning, an activity, as previously noted, which when added to the child's sub-clinical eye oscillation or nystagmus and his dysmetric ocular pursuit, ultimately results in blurring and letter and word scrambling, and thus poor reading performance and understanding. As a practical solution, the within method recognizes that although the dysmetric dyslexic child is unable to properly perform sequential scanning, he nevertheless is capable of performing as well as a normal person in static vision exercises, i.e. in an exercise which requires his identification of stationary objects of fixed height at specified distances. That is, during static vision, the cerebellar-vestibular dysfunction is minimized, and thus by presenting reading material in a temporal sequence on a fixed focus, what is achieved, in effect, is a by-passing or circumvention of the cerebellar-vestibular dysfunction underlying dysmetric dyslexia. The within method thus contemplates the presentation of reading material in letter or word-sized units, one at a time and in reading sequence, at a fixed location, so that the child reading is not required to follow a moving target with significant tracking movements in his eyes or head. As a result, there is no significant eye vibration or nystagmus imposed upon the child which results in ocular overshooting and undershooting, and in turn, contributing to failure of the child to properly focus and perceive the material being presented for reading, thus avoiding blurring, scrambling and resulting anxiety, frustration and avoidance of reading and learning.

Apparatus for practicing the within method is illustrated in the drawings, to which reference is now made. The preferred form of this apparatus includes a conventional slide projector 10 having a circular slide-holder 12. The internal mechanisms of the projector 10 provide a mode of operation in which a plurality of slides, individually and collectively designated 14, are sequentially moved into position so that the content of each slide is projected, one at a time via the light beam 16, into display position 18, all as is illustrated in FIG. 1A. As noted in FIG. 1A, the content of the projected slide is the letter "T". It is an important aspect of the present invention, and should therefore be noted, that the specific display position of the letter "T" is one that is fixed, in the illustrated instance being at the location X.

Referring now to FIG. 1B, the practice of the within invention contemplates operation of the projector 10 so that the display position 18 of the next slide 14, that is the one following the slide making the display presentation of FIG. 1A, is located also at the location X. In this instance, the content of the slide provides a projected image of the letter "H" in the projected display 18.

FIG. 1C illustrates a succeeding display 18 which contains the letter "E", also at the fixed location X.

Actually, the exercise illustrated by FIGS. 1A, 1B and 1C is not strictly the presentation of reading material, but rather the presentation of individual letters for purposes of teaching their recognition, so that once this recognition is mastered, the child can then learn how to recognize words formed of these letters. For example, the combined effect of the displays 18 of FIGS. 1A, 1B and 1C is the teaching of the word "THE" to the child. Most important, said word "THE" has been presented to the child, who will be understood to be in reading relation to the display 18 in much the same way that the projector 10 is in projecting relation thereto, so that the child is required to only sight along the line 20 to perceive each of the letters. That is, the child is not required to move his head off of the sight line 20 in order to perceive the reading material being presented by the projector 10, and in this manner the child is relieved of any requirement to perform sequential scanning in order to read the material being presented for reading by the projector 10.

From the description already provided, the significance of FIGS. 2A–2C should be more readily apparent. The objective of the reading exercise illustrated by these figures is to present the sentence "THE BOY RAN" for reading by the dysmetric dyslexic child. If this sentence was initially presented in the conventional manner, i.e. with all three words horizontally aligned in reading sequence from left to right, the dysmetric dyslexic child would have great difficulty comprehending this reading material in this conventional presentation. The reason, as already noted, is that during movement of the child's eyes from left to right in sequentially scanning the sentence, the child would experience an eye oscillation which when added to the eye oscillation which he is always experiencing because of the dysfunctioning of his cerebellar-vestibular circuits, would result in blurring, letter and word scrambling, an accompanying anxiety and similar interference with proper reading. Thus, in accordance with the present invention, the sentence "THE BOY RAN" is broken down into three displays, designed respectively in FIGS. 2A–2C as 20, 22 and 24. That is, the reading material, in this instance the sentence "THE BOY RAN", is broken down into word-sized units, in the illustrated instance being the three individual words of said sentence. Each said selectively diminished-sized unit, designated 26, of the sentence or reading material is displayed in the cooperating displays 20, 22 and 24 in their reading sequence and, most important, each is displayed at the fixed location X. Thus the child reading the displays 20, 22 and 24 in the reading sequence in which they are presented is provided with an understanding of the meaning intended to be conveyed by the sentence formed by the subject matter 26 of the three displays 20, 22 and 24. However, because of the manner in which the reading material 26 is presented, as just described, the dyslexic child is able to perform the required reading thereof without experiencing reading difficulties, mainly because there is no sequential scanning required of him. Stated another way, in accordance with the within method ocular fixation is required only at the location X, and the subject matter at that location is changed in order to present the sentence to the child for reading.

Although the apparatus selected to illustrate the invention is one which provides an image projection on a remote display screen, it should be readily appreciated that the method can just as readily be performed by other apparatus. For example, the displays of FIGS. 2A–2C can be formed on a viewing screen which is an integral part of a projector, rather than being beamed to a remote display screen. For some forms of dysmetric dyslexia, reading is more readily performed if the reading material 26 is at a slight angle, and so the method of presentation would be practiced with this adjustment. Each dyslexic child, whose inner axis is tilted, has a maximum visual plane, which frequently is different from that of a normal child, and this can be accommodated to by the angle at which the reading material is presented. Another contemplated modification is in the size of the area defining the location X. Said size will eventually expand horizontally and in perspective, i.e. in depth, according to the child's compensatory state.

In other respects, as well, a latitude of modification, change and substitution is intended in the foregoing disclosure, and in some instances some aspects of the invention will be used without a corresponding use of other aspects. Accordingly, it is appropriate that the appended claims be contrued broadly and in a manner consistent with the spirit and scope of the invention herein.

What is claimed is:

1. A method of presenting reading material to a child previously identified as being dyslexic because of dysfunctioning cerebellar-vestibular circuits, which is based on the discovery that said cerebellar-vestibular dysfunction results in a sub-clinical eye oscillation and dysmetric ocular pursuit indicative of said condition, said method comprising the steps of preparing selectively diminished-sized units of reading material for display presentation independently of each other, arranging the aforesaid prepared units for presentation in reading sequence, and presenting said units, one at a time and in reading sequence, in a display position at a selected fixed location so as to be read by said child, whereby the reading thereof by said child is without significant sequential scanning.

2. The method of presenting reading material as claimed in claim 1 wherein said reading material units are word-size.

3. The method of presenting reading material as claimed in claim 2 wherein said word-size units are horizontally oriented in a central position of a projection display.

4. The method of presenting reading material as claimed in claim 1 wherein said reading material units are individual letters, to thereby teach recognition thereof to said child preparatory to said child reading words formed of said letters.

5. The method of presenting reading material as claimed in claim 1 wherein said displayed reading material units are at an angular orientation selected to facilitate ocular fixation thereon by said dyslexic child.

6. The method of presenting reading material to a child who is dyslexic because of dysfunctioning cerebellar-vestibular circuits, which is based on the discovery that said cerebellar-vestibular dysfunction causes a sub-clinical eye oscillation in said child, said method comprising the steps of preparing for image projection word-size units of reading material for display presentation independently of each other, and projecting the aforesaid prepared units, one at a time and in reading sequence, as an image in a display position fixed as to horizontal and vertical locations and in reading relation to said dyslexic child, whereby the reading thereof by said child is readily achieved without significant sequential scanning.

7. The method of presenting reading material as claimed in claim 6 wherein said displayed reading material units are horizontally oriented in a central position of a projection display.

8. The method of presenting reading material as claimed in claim 6 wherein said displayed reading material units are at an angular orientation selected to facilitate ocular fixation thereon by said dyslexic child.

* * * * *